(12) United States Patent
Heller et al.

(10) Patent No.: US 9,911,125 B2
(45) Date of Patent: **\*Mar. 6, 2018**

(54) PREVENTING CONTACT BY LOCKING

(71) Applicant: BANK OF AMERICA CORPORATION, Charlotte, NC (US)

(72) Inventors: Ryan Scott Heller, Middletown, DE (US); Chung-Di Chou, Wilmington, DE (US); John J. Gately, New Port Richey, FL (US); Hudson Philip Hoen, IV, Wilmington, DE (US); Andrew Sheldon, Mountain Top, PA (US); Patrick B. Smith, Garland, TX (US); Veera Venkata Vattikuti, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 895 days.

This patent is subject to a terminal disclaimer.

(21) Appl. No.: 14/071,246

(22) Filed: Nov. 4, 2013

(65) Prior Publication Data

US 2015/0127561 A1 May 7, 2015

(51) Int. Cl.
*G06Q 10/10* (2012.01)
*G06Q 30/02* (2012.01)
*G06Q 30/06* (2012.01)
*G06Q 30/00* (2012.01)
*G06Q 10/06* (2012.01)

(52) U.S. Cl.
CPC ......... *G06Q 30/018* (2013.01); *G06Q 10/067* (2013.01); *G06Q 30/016* (2013.01)

(58) Field of Classification Search
CPC ... G06Q 10/067; G06Q 30/016; G06Q 30/018
USPC .................................. 705/1.1–912, 304, 348
See application file for complete search history.

(56) References Cited

U.S. PATENT DOCUMENTS

| | | | |
|---|---|---|---|
| 3,784,721 A | 1/1974 | Kilby | |
| 4,893,335 A | 1/1990 | Fuller et al. | |
| 5,692,038 A | 11/1997 | Kraus et al. | |
| 5,907,600 A | 5/1999 | Fuller et al. | |
| 5,924,016 A | 7/1999 | Fuller et al. | |
| 6,320,947 B1 | 11/2001 | Joyce et al. | |
| 6,381,323 B1 | 4/2002 | Schwab et al. | |
| 6,421,439 B1 | 7/2002 | Liffick | |
| 6,453,164 B1 | 9/2002 | Fuller et al. | |
| 7,007,239 B1 | 2/2006 | Hawkins et al. | |
| 8,738,076 B1 * | 5/2014 | Hitchcock | H04M 1/00 455/426.2 |

(Continued)

*Primary Examiner* — Jonathan P Ouellette
(74) *Attorney, Agent, or Firm* — Michael A. Springs; Moore & Van Allen PLLC; Nicholas C. Russell

(57) ABSTRACT

Embodiments of the invention relate to systems, methods, and computer program products for preventing a customer communication by locking access to customer information. The system, method, and computer program product are configured to a) identify information relating to an event or condition that triggers a lock of customer information associated with a customer; b) lock at least a portion of the customer information associated with the customer based at least partially on the identifying; and c) generate a notification indicating that at least the portion of the customer information associated with the customer is locked based at least partially on the locking.

19 Claims, 11 Drawing Sheets

(56) References Cited

U.S. PATENT DOCUMENTS

| | | |
|---|---|---|
| 2001/0026609 A1 | 10/2001 | Weinstein et al. |
| 2002/0141548 A1 | 10/2002 | Boda |
| 2003/0147519 A1 | 8/2003 | Jain et al. |
| 2003/0152207 A1 | 8/2003 | Ryan |
| 2003/0194071 A1 | 10/2003 | Ramian |
| 2003/0212566 A1* | 11/2003 | Fergusson ............ G06Q 30/018 705/317 |
| 2004/0044604 A1* | 3/2004 | O—Neil ................ G06Q 40/02 705/35 |
| 2004/0114747 A1 | 6/2004 | Trandal et al. |
| 2005/0032527 A1 | 2/2005 | Sheha et al. |
| 2005/0091272 A1 | 4/2005 | Smith et al. |
| 2006/0047571 A1* | 3/2006 | Garcia ................... G06Q 30/02 705/14.64 |
| 2006/0053047 A1* | 3/2006 | Garcia ............... G06Q 30/0267 705/14.64 |
| 2007/0266156 A1 | 11/2007 | Wilkins |
| 2008/0010687 A1 | 1/2008 | Gonen et al. |
| 2008/0205655 A1 | 8/2008 | Wilkins et al. |
| 2009/0110163 A1 | 4/2009 | Gupta |
| 2009/0254511 A1* | 10/2009 | Yeap ................... G06F 21/6245 |
| 2010/0254525 A1 | 10/2010 | Maly et al. |
| 2010/0305988 A1* | 12/2010 | Agarwal ................ G06Q 30/02 705/7.41 |
| 2015/0103998 A1* | 4/2015 | Rosandich .......... H04M 3/5158 379/266.01 |
| 2015/0213446 A1 | 7/2015 | Joyce et al. |

* cited by examiner

| PHONE NUMBERS | | | | | | | | |
|---|---|---|---|---|---|---|---|---|
| | REMAINING ATTEMPTS | | | | | | | |
| | CALLS | MESSAGES | PHONE USE | LINE TYPE | STATE | DIALER | PRE-RECORDED MSG | TEXT MSG | IMPLICIT CONSENT |
| (✓) (XXX) XXX-XXXX | xx | xx | HOME | CELL | XX | * | * | * | * |
| (✓) (XXX) XXX-XXXX | xx | xx | HOME | CELL | XX | * | * | * | * |
| (!) (XXX) XXX-XXXX | xx | xx | HOME | CELL | XX | * | * | * | * |
| | * PLEASE OBTAIN CONSENT USING THE MOBILE PHONE NUMBER OPT IN CSI | | | | | | | |

PREVENTING CONTACT BY LOCKING

BACKGROUND

In 1991, the Telephone Consumer Protection Act (TCPA) was passed by the United Stated Congress and signed into law. One provision of the TCPA prevents automated telephone equipment from dialing any telephone number assigned to a paging service, cellular telephone service, specialized mobile radio service, or other radio common carrier service, or any service for which the called party is charged for the call without the prior express consent of the called party. Thus, there is a need for a system to determine whether a merchant has permission to contact a customer via automated telephone equipment.

SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Brief Summary of Determining Preferred Time to Contact

An invention for determining one or more preferred times for contacting a customer is provided. In some embodiments, the invention includes a computer apparatus including a processor and a memory; and a software module stored in the memory, comprising executable instructions that when executed by the processor cause the processor to: a) determine one or more contacts for a customer; b) determine regulations and/or policies associated with communicating with customers; and c) determine one or more optimal times from a twenty-four hour time period for contacting the customer based at least partially on the determined one or more contacts for the customer and the determine regulations and/or policies.

In some embodiments, the invention determines one or more time zones associated with each of the one or more contacts of the customer.

In another embodiment, the regulations and/or policies associated with communicating with customers relate to rules for restricting times of day a customer may be contacted by a business entity.

In some embodiments, the determining one or more optimal times for contacting the customer comprises: a) determining a matrix of one or more optimal times within a twenty-four hour time period for contacting the customer based at least partially on information associated with the determined one or more contacts for the customer and information associated with the regulations and/or policies associated with communicating with customers; and b) identifying from the matrix, at least, one optimal time for contacting the customer and, at least, one customer contact associated with the one optimal time for contacting the customer.

In some embodiments, the determining one or more optimal times for contacting the customer comprises: a) determining a calendar of one or more optimal times within a twenty-four hour time period for contacting the customer based at least partially on 1) information associated with the determined one or more contacts for the customer, 2) the determined one or more time zones associated with each of the one or more contacts of the customer, and 3) information associated with the regulations and/or policies associated with communicating with customers; and b) identifying from the calendar, at least, one optimal time for contacting the customer and, at least, one customer contact associated with the one optimal time for contacting the customer.

In yet another embodiment, the invention determines one or more customer preferences for contacting the customer and for determining one or more customer-provided schedules for contacting the customer; and wherein the determining one or more optimal times for contacting the customer comprises: a) determining a list of one or more optimal times within a twenty-four hour time period for contacting the customer based at least partially on 1) information associated with the determined one or more contacts for the customer, 2) the determined one or more time zones associated with each of the one or more contacts of the customer, 3) the determined customer preferences and the determined customer-provided schedules for contacting the customer; and 4) information associated with the regulations and/or policies associated with communicating with customers; and b) identifying from the list, at least, one optimal time for contacting the customer and, at least, one customer contact associated with the one optimal time for contacting the customer.

In yet a further embodiment, the invention stores the determined matrix of one or more optimal times for contacting the customer in a file designated for the customer or with information associated with an account held by the customer.

Brief Summary of Preventing Contact by Locking

An invention for preventing a customer communication by locking access to customer information is provided. In some embodiments, the invention includes a computer apparatus including a processor and a memory; and a software module stored in the memory, comprising executable instructions that when executed by the processor cause the processor to: a) identify information relating to an event or condition that triggers a lock of customer information associated with a customer; b) lock at least a portion of the customer information associated with the customer based at least partially on the identifying; and c) generate a notification indicating that at least the portion of the customer information associated with the customer is locked based at least partially on the locking.

In some embodiments, the invention flags for review and/or specific validation the identifying information relating to the event or condition that triggers the lock of customer information.

In a further embodiment, the event or condition relates to a determination that an entity attempting to communicate with the customer has received a cease and desist letter from said customer.

In yet another embodiment, the event or condition relates to a determination that the customer or information associated with the customer is attributed to an exclusion list for not contacting the customer.

In some embodiments, the event or condition relates to a determination that the customer is in real-time communication with an agent of the entity attempting to communicate with the customer.

In some embodiments, the locking at least a portion of the customer information associated with the customer includes preventing an access to customer information by an agent of an entity attempting to contact the customer by denying access to at least a portion of electronic data associated with the customer.

In one embodiment, the locking at least a portion of the customer information associated with the customer includes preventing a use of customer information by an agent of an entity attempting to contact the customer by disabling a use of customer contact information by the entity, wherein customer contact information comprises a phone number for contacting the customer.

Other aspects and features, as recited by the claims, will become apparent to those skilled in the art upon review of the following non-limited detailed description of the invention in conjunction with the accompanying figures.

BRIEF DESCRIPTION OF THE DRAWINGS

Figure 1:
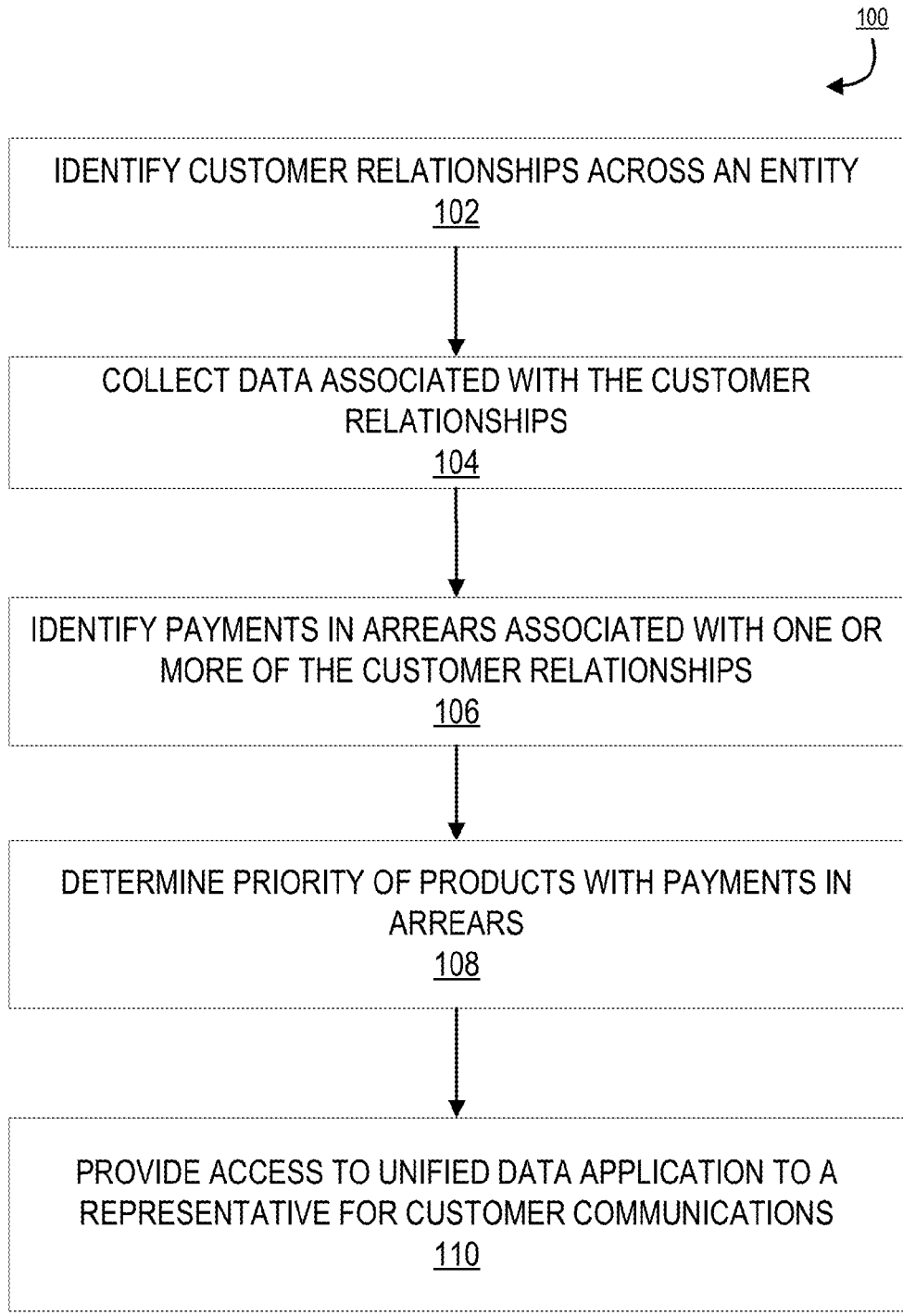
Figure 2:
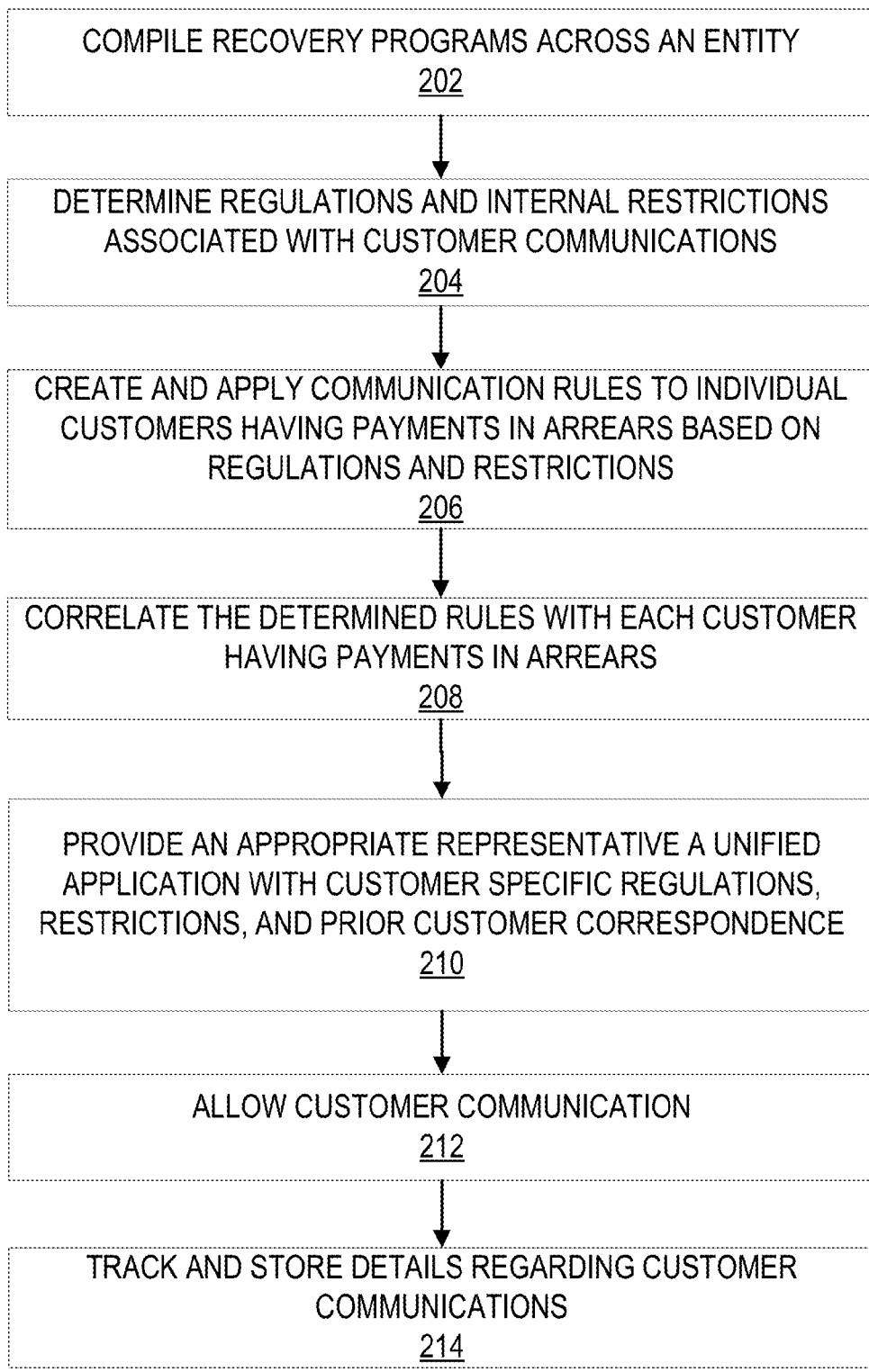
Figure 3:
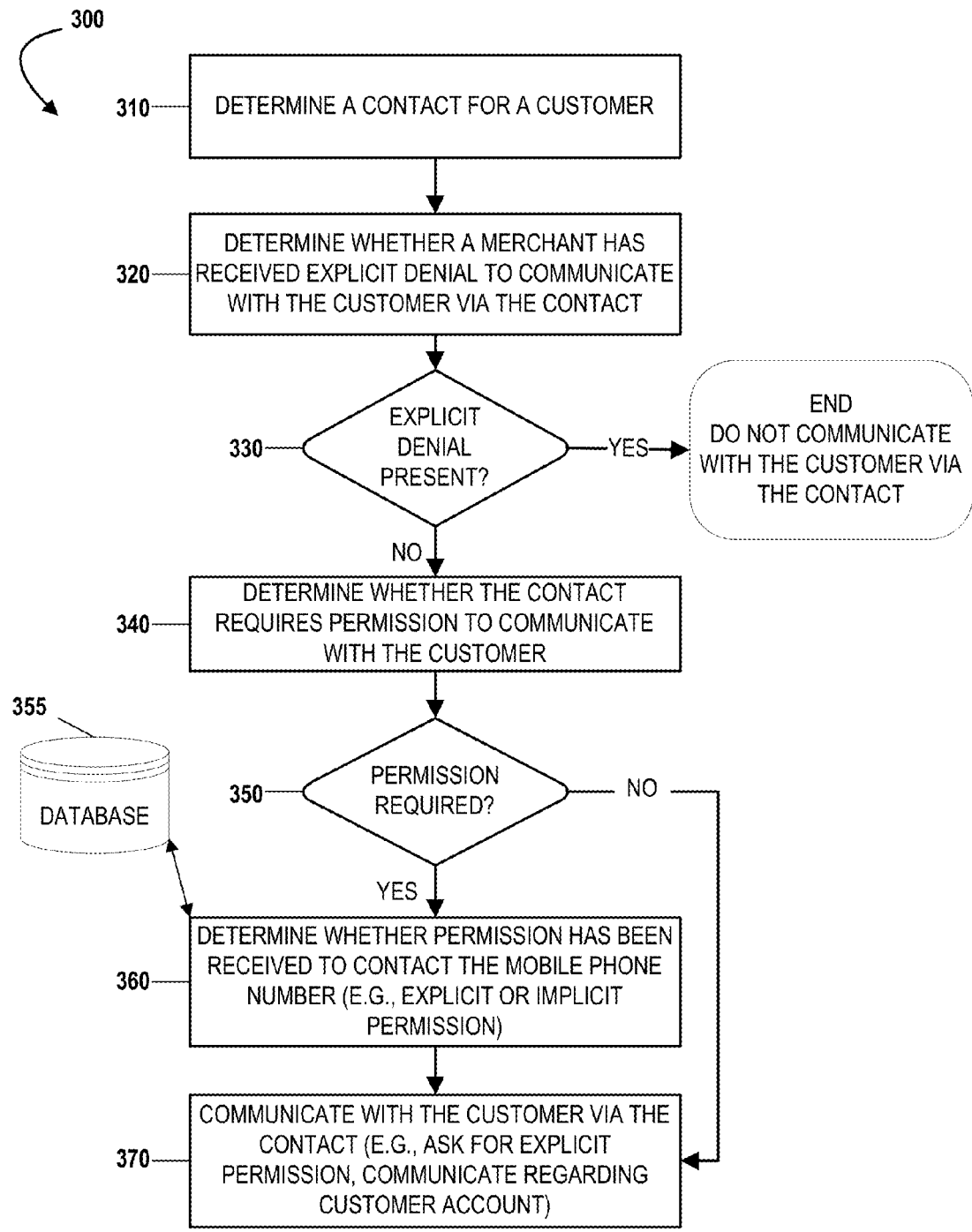
Figure 4:
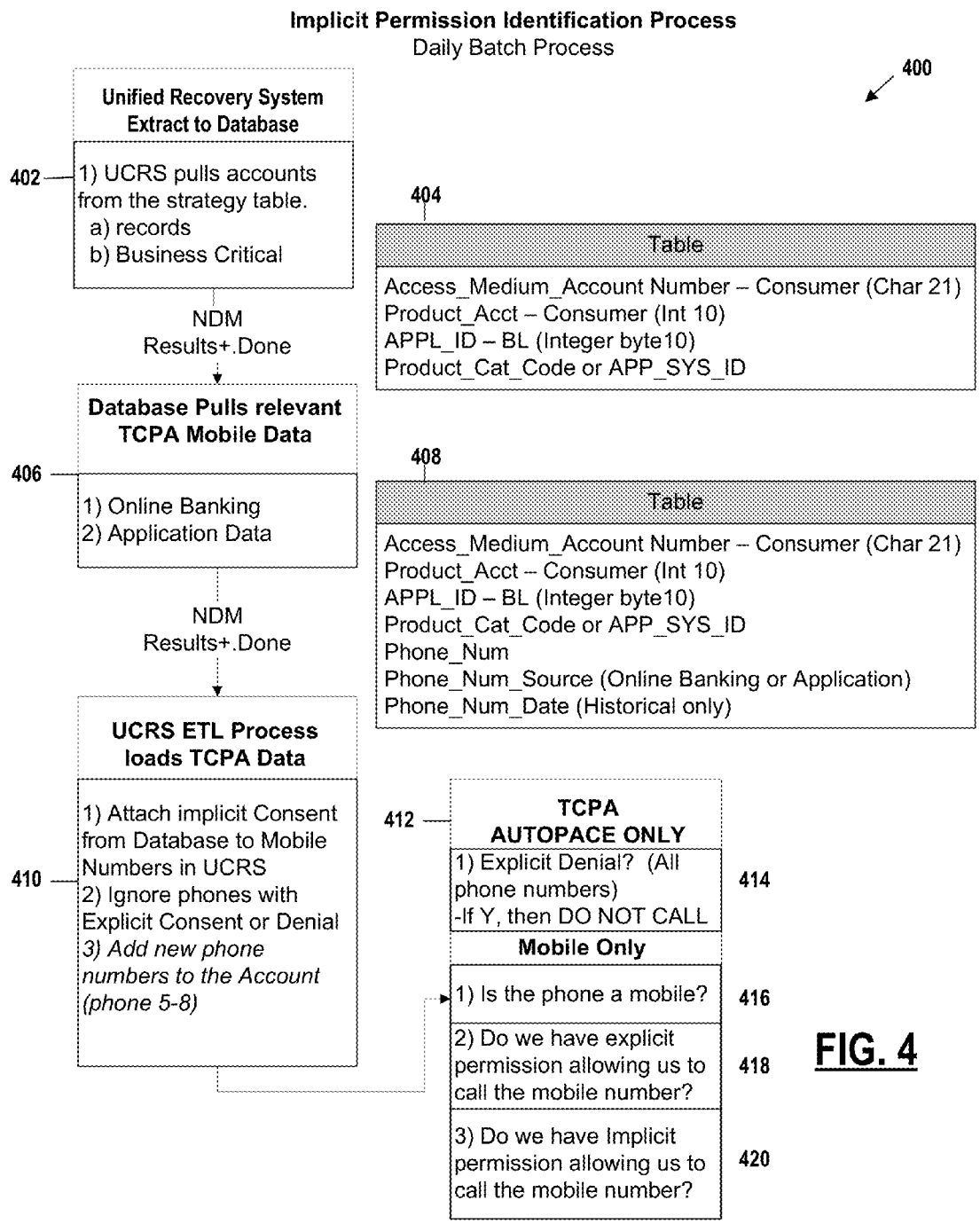
Figure 5:
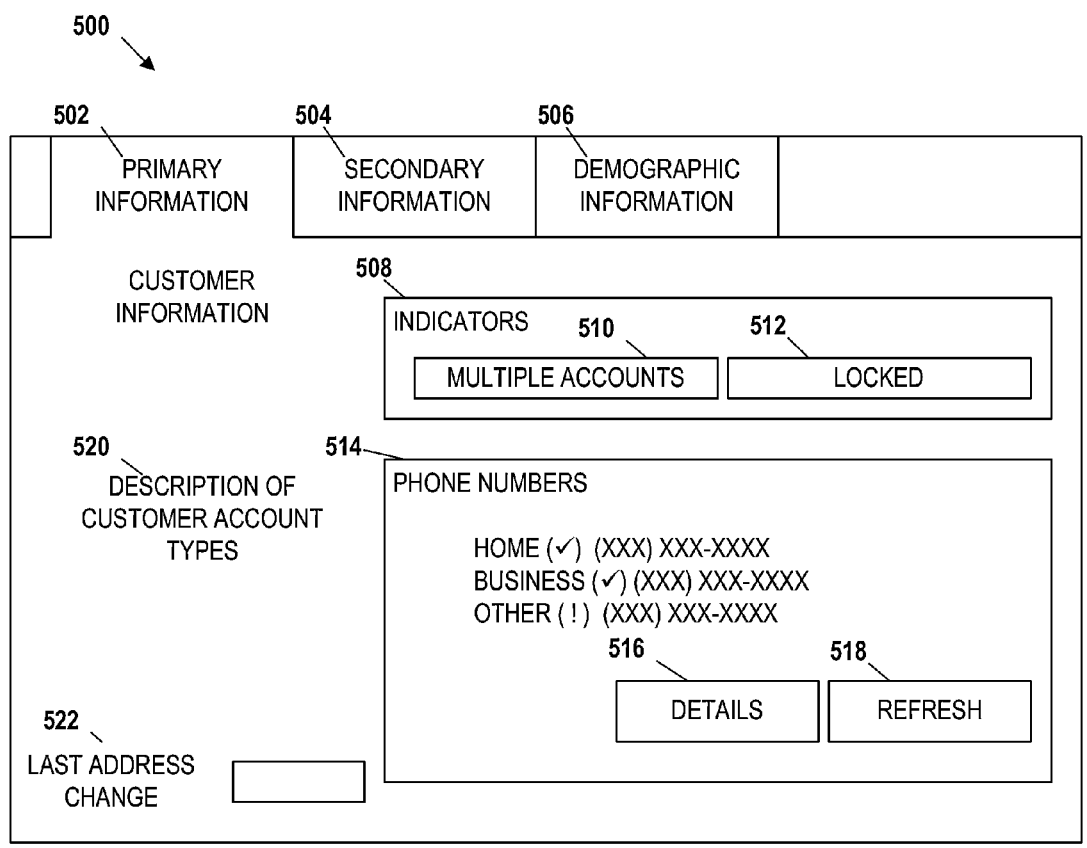
Figure 7:
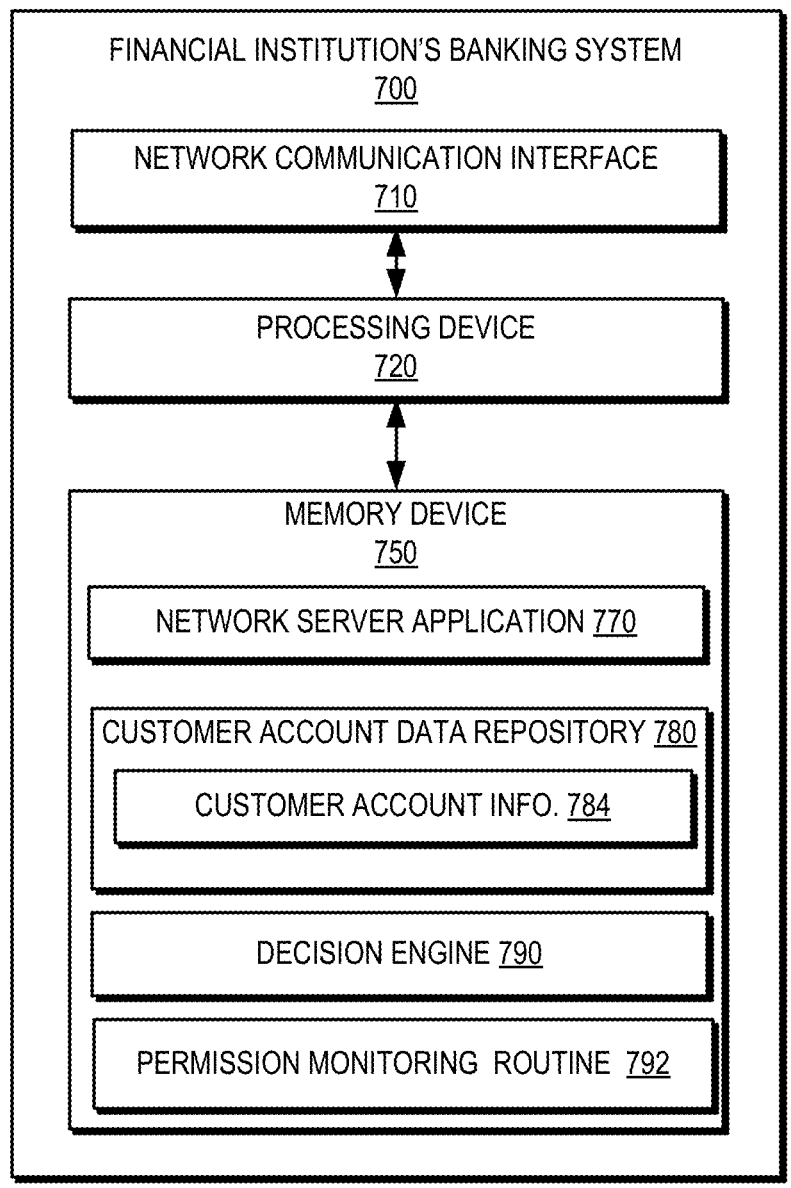
Figure 8:
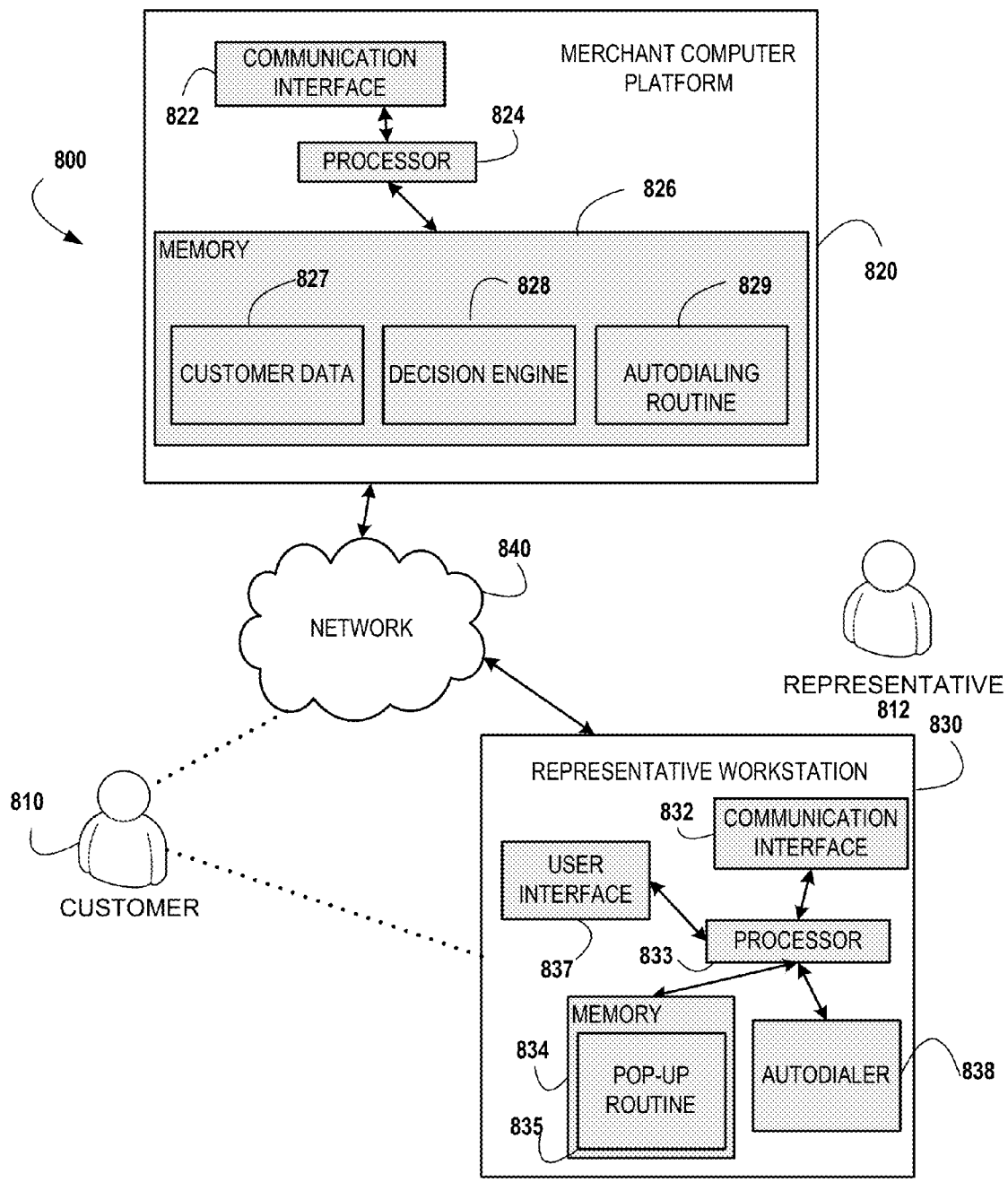
Figure 9:
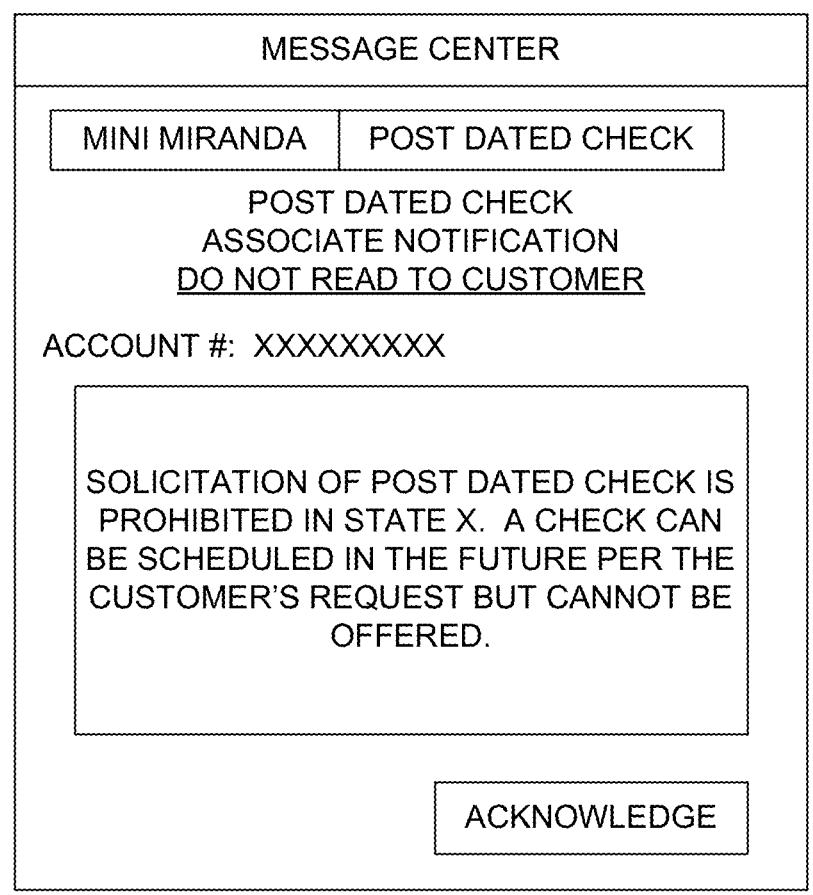

Having thus described embodiments of the invention in general terms, reference will now be made to the accompanying drawings, which are not necessarily drawn to scale, and wherein:

FIG. 1 provides a high level process flow illustrating the unified recovery process, in accordance with one embodiment of the present disclosure;

FIG. 2 provides a high level process flow illustrating the unified recovery system process, in accordance with one embodiment of the present disclosure;

FIG. 3 is a flow diagram illustrating a high-level process flow for a system and method for implementing a workflow rules engine, in accordance with embodiments of the disclosure;

FIG. 4 is a flow diagram illustrating a process flow for identifying implicit permission to contact, in accordance with embodiments of the disclosure;

FIG. 5 is an exemplary screenshot of a graphical representation of a primary information screen for a customer, in accordance with embodiments of the disclosure;

FIG. 6 is an exemplary screenshot of a graphical representation of contacts for a customer, in accordance with some embodiments of the disclosure;

FIG. 7 is a block diagram illustrating exemplary technical components of a financial institution banking system, in accordance with an embodiment of the present disclosure;

FIG. 8 is a block diagram of an environment for implementing a system to determine permission to contact, in accordance with an embodiment of the present disclosure;

FIG. 9 is an exemplary screenshot of a graphical representation of a pop-up for guiding a representative to seek permission to contact, in accordance with an embodiment of the present disclosure.

Figure 10:
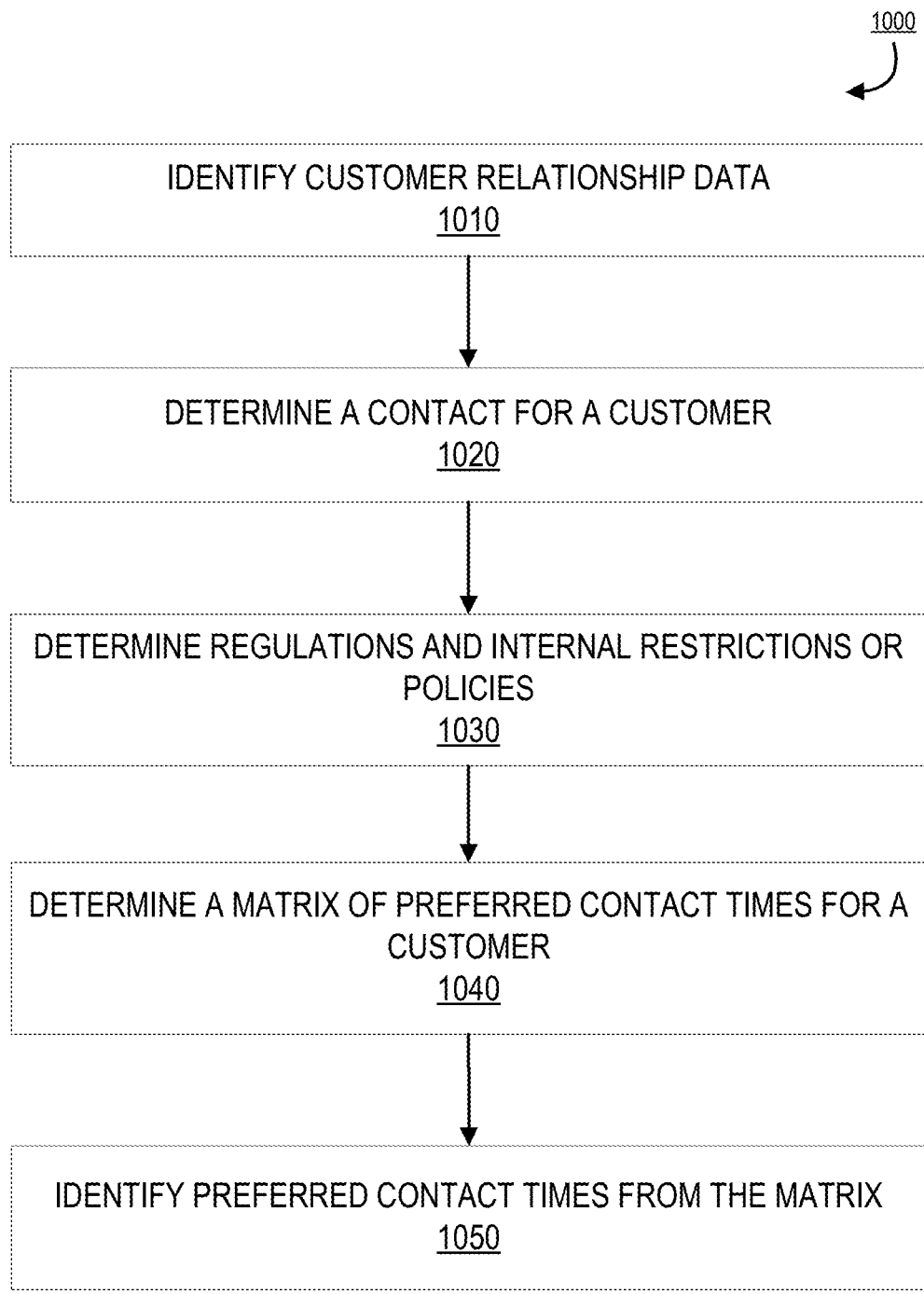
Figure 11:
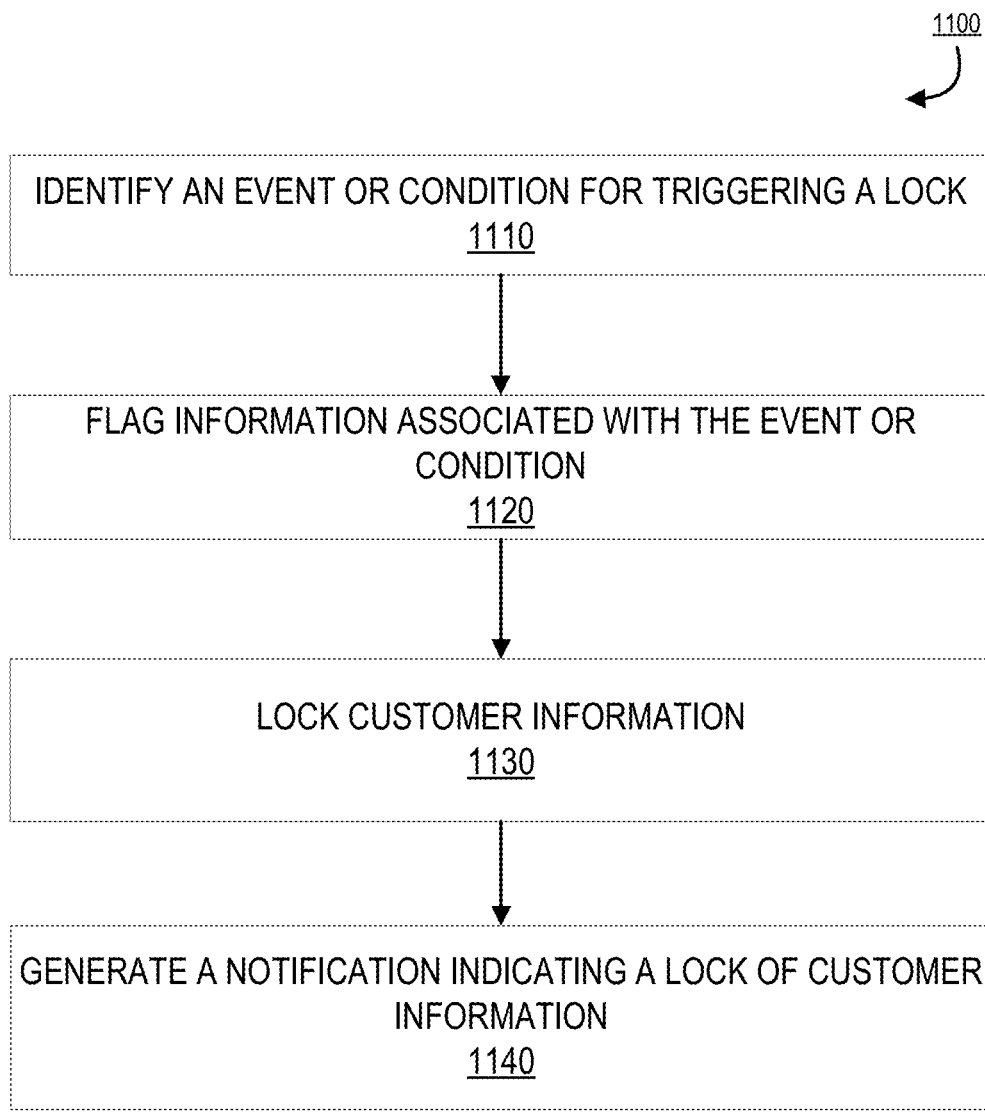

FIG. 10 provides a general process flow 1000 for an apparatus or system for determining optimal times for contacting a customer consistent with an embodiment of the present invention FIG. 11 provides a high level process flow 1100 for an apparatus or system for preventing a communication with a customer by locking access to customer information, in accordance with an embodiment of the present disclosure.

DETAILED DESCRIPTION OF EMBODIMENTS OF THE INVENTION

Embodiments of the present disclosure now may be described more fully hereinafter with reference to the accompanying drawings, in which some, but not all, embodiments of the disclosure are shown. Indeed, many different forms may be possible and the disclosure should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." It should also be understood that while some embodiments describe the methods or products as comprising one or more elements, the methods or elements may also consist of or consist essentially of the elements disclosed herein.

Furthermore, the term "product" or "account" as used herein may include any financial product, service, or the like that may be provided to a customer from an entity that subsequently requires payment. A product may include an account, credit, loans, purchases, agreements, or the like between an entity and a customer. The term "relationship" as used herein may refer to any products, communications, correspondences, information, or the like associated with a customer that may be obtained by an entity while working with a customer. Customer relationship data may include, but is not limited to addresses associated with a customer, customer contact information, customer associate information, customer products, customer products in arrears, or other information associated with the customer's one or more accounts, loans, products, purchases, agreements, or contracts that a customer may have with the entity.

Although embodiments of the present invention described herein are generally described as involving a merchant, it will be understood that merchant may involve one or more persons, organizations, businesses, institutions and/or other entities such as financial institutions, that implement one or more portions of one or more of the embodiments described and/or contemplated herein.

Thus, apparatus, systems, methods and computer program products are herein disclosed for determining whether a merchant has permission to contact a customer. Inasmuch as financial institutions often contact customers to discuss accounts and/or offer new products, specific embodiments disclosed herein relate to financial institutions. However, such embodiments are exemplary.

FIG. 1 illustrates a high level process flow for a unified recovery process 100 in which the system to determine permission to contact may be used. As illustrated in block 102, the process 100 begins with identifying customer relationships across an entity. In this way, the system may identify all products that a customer may have with the entity across one or more lines of business within the entity. As such, addresses, affiliates, phone numbers, customer products, products with payments that are in arrears, and any other information that may be associated with a single customer may be gathered across the lines of business of an entity. Next, as illustrated in block 104, the data associated with the customer relationships may be collected and compiled in association with the customer. As such, all relationship data may be stored in association with a customer including those products and/or accounts that are in arrears.

The next step in the process 100, as illustrated in block 106, is to identify payments in arrears associated with the customer. As such, the products or accounts that have payments in arrears that are associated with that particular customer are identified. A product or account with a payment in arrears may be qualified as being in arrears based on the entity itself and/or agreements for payment between the customer and the entity. For example, after the due date for payment for the product or after a predetermined number of days after the due date, the product may be considered by the entity to be in arrears. Furthermore, the accounts or products with payments in arrears for people affiliated with that customer, such as when the customer is a guarantor for the associate or the like, may also be identified by the system. People affiliated with the customer may include friends, family, or the like associated with the customer.

As illustrated in block 108, the system determines the priority of the products with payments in arrears. In this way, the system may determine which products in arrears should take priority over the other products for purposes of recovery of payments. The primary account for recover is the account or product that the entity has identified as having payment in arrears that is the one which needs to be recovered first. This may be based on entity determination, interest rate, amount, importance, or the like. As such, the system may identify the products with payments in arrears that are the most important to recover first ahead of the other payment products. Thus, the representative may focus on recovering payments for that identified product.

Finally, as illustrated in block 110, the process 100 continues by providing access to a unified application to a representative for customer communications. The unified application provides the representative with an across the entity view of the customer's relationship with the entity as well as information associated with the primary account and other accounts with payments in arrears. The unified application may also use the system and method to determine permission to contact prior to allowing the representative to communicate with the customer. Finally, the unified application also provides information associated with prior customer communications. As such, the invention provides a holistic customer service experience for a customer with accounts in arrears.

FIG. 2 illustrates a high level process flow for the unified recovery system process 200, in accordance with one embodiment of the present disclosure. The process 200 describes a high level of the unified recovery system's steps to providing a representative with the unified application to aid in payment in arrears recovery. First, as illustrated in block 202, the system compiles the various recovery programs across the entity. In this way, all recovery programs may be centralized, such that the representative can log into a single system. This eliminates requiring the representative to log into a plurality of software programs in order to view and understand all relationships a customer has with the entity.

Next, as illustrated in block 204, the system may determine regulations and internal restrictions associated with individual customer communications. Regulations may include laws or other regulations regarding the time of day a customer may be contacted, the amount of times within a given day/week/month that a customer may be contacted, a telephone number in which a customer may be contacted, or the like. As such, the system ensures that the representative is following all regulations and/or laws regarding the contacting of customers with products having payments in arrears. Internal regulations may include any rule that an entity may put in place to restrict or warn a representative prior to the representative contacting a customer or during the representative's communication with the customer. For example, an internal regulation may be set based on a customer communication preference, such as a specific telephone number to utilize for communications with the customer. In another example, the entity may identify an event that requires the entity to delay in communicating with a customer regarding a product with a payment in arrears (e.g., a natural disaster in the geographic are where the customer is located or another known event that may interfere with a customer providing payment).

In some embodiments, the regulations or restrictions may, in some instances, be overridden by the representative. In this way, the representative may still contact the customer even if a regulation or restriction is in place. The representative may need to input a reason for overriding the regulation or restriction. In some embodiments, the regulation or restriction may not be overridden by any representative. In this way, the system will not allow the representative to communicate with the customer at that time. In some embodiments, no regulation or restriction may be placed on a customer communication. As such, the representative may contact the customer at any time.

Next, as illustrated in block 206 the system may utilize the regulations and restrictions to create rules for customer communications. These rules may be created and applied to a customer on a customer-by-customer basis. In this way, each customer, based on the customer's location, telephone number, or the like, may have a unique set of rules applied for him/her based on regulations and/or restrictions that may apply to the customer having payments in arrears for products. Next, once the rules have been created and applied in block 206, the determined rules may be correlated with each individual customer having payments in arrears, as illustrated in block 208. In some embodiments, the system to determine permission to contact is also used to determine rules for when a customer may be contacted.

As illustrated in block 210 of FIG. 2, the system may provide a unified application for displaying a customer relationship to an appropriate representative. The unified application has specific regulations, restrictions, and prior customer correspondence associated therewith. An appropriate representative may be identified by the system based on which representative has experience with that particular customer, knowledge with a particular account in arrears, or general expertise regarding a field associated with the primary account for recovery. The system may identify and match the customer with the appropriate representative based on these factors.

Next, as illustrated in block 212 the system may allow the representative to initiate a communication with the customer. Allowing the representative to initiate a communication with a customer may be based on the determined regulations and restrictions. In some embodiments, the regulations and restrictions will not allow a representative to communicate with the customer. In some embodiments, the regulations and restrictions will warn against communicating with the customer. However, a representative may be able to override the warning. In some embodiments, the regulations and restrictions will allow a representative to communicate with the customer.

Finally, as illustrated in block 214, the system may track and store details regarding the customer communications. In this way, the system may track the disposition of the communication, such as determining if a communication was answered by the customer, a busy signal was received, or that the customer answered the communication. The system may identify the date, time, means of communication (such as specific telephone number, email address, or the like). Furthermore, the system may store any comments or notes made by the representative during the communications.

FIG. 3 illustrates a general process flow 300 for an apparatus or system for determining permission to contact a customer consistent with an embodiment of the present disclosure. In some embodiments, the system determines a contact for a customer, determines whether the contact requires permission to communicate with the customer, determines whether permission has been received, and communicates with the customer via the contact. In some embodiments, the system also determines whether explicit denial to contact the customer has been received. The system may also prompt a representative communicating with the customer to request permission to communicate with the customer through additional channels in the future.

As shown in block 310, the system determines a contact for a customer. A contact is a piece of information that allows another party to communicate with the customer. For example, the contact may be a phone number, e.g., a landline or mobile phone number. The system disclosed herein may be used with various types of contacts, including phone numbers for voice or text messaging, email addresses, private messaging address (such as through a web forum, social network messaging, instant messaging, physical mail, in-person contact, messages provided when logging into merchant websites, messages on ATMs or receipts, and the like.

In some embodiments, the contact is provided by the customer. For example, the customer may enter a phone number into a form when applying for an account. The customer may provide an email address when registering for electronic statements. In further embodiments, the contact is retrieved by the system. For example, the system may determine that a newly opened account does not have a contact phone number associated with it but that the account is related to another account having an associated phone number. The system may also retrieve contacts from publicly-available information, such as databases of contacts for customers, social networks, or the like.

In some embodiments, the customer is a customer of the merchant, e.g., the financial institution communicating with the customer. The customer may have an account or relationship with the merchant. For example, the customer may have a credit card or line of credit with the merchant. In some embodiments, the merchant is communicating with the customer regarding accounts in arrears or discussing recovery of payment in arrears. In further embodiments, the customer is a customer of a third party associated with the merchant. For example, the merchant may be contracted to communicate with the customer by the third party. In a still further embodiment, the customer is a potential customer of the merchant or a third party. The customer may be an individual or an entity such as a business, non-profit, or governmental entity. The customer may have multiple contacts and multiple accounts with the merchant.

In some embodiments, the contact is determined automatically by the system. For example, the contact may be determined based on criteria associated with the customer. If the customer has an account in arrears, the contact may be determined by the system after a search criteria identifies the account in arrears. In some embodiments, the contact is identified based on search criteria entered by an administrator or representative. For example, the administrator may be creating an autodial campaign for phone numbers based on location, account characteristics, and the like. The system to determine permission to contact can act in the background to provide only those contact phone numbers which the system has permission to contact to the administrator. In this embodiment, search criteria are used to create an autodial list comprising contacts which the system has permission to contact.

In block 320, in some embodiments the system determines whether a merchant has received explicit denial to communicate with the customer via the contact. For example, a customer may have explicitly informed the merchant that the customer does not wish to be communicated with via the contact. The customer may inform the merchant not to call the customer, email the customer, text message the customer, or the like. In some embodiments, the customer informs the merchant to only contact the customer via a specific channel, such as via postal mail. In an embodiment, the system receives the explicit denial to communicate with the customer via the contact and stores the denial in a database. The system may receive the denial directly from the customer or via a third party. For example, the customer or a representative of the customer may send a letter to the merchant providing explicit instructions to not be contacted via a specific contact means. In some embodiments, the customer provides explicit denial to communicate via a specific channel, e.g., a specific phone number or email address, but in further embodiments the customer provides explicit denial to communicate with the customer via all contacts associated with the customer.

In an embodiment, the explicit denial is a request from the customer to not be communicated with via one or more channels. The explicit denial may be a cease and desist letter. In some embodiments, the explicit denial is conditional on characteristics of the merchant, the customer, or the communication. For example, the customer may provide explicit denial to communicate via a contact between the hours of 9:00 pm and 9:00 am. The system determines the time of the communication and evaluates whether the conditional denial is present. In some embodiments, the conditional denial is based on actions of the customer. For example, the customer may inform the system to not communicate with the customer unless the customer has an account in arrears.

Communicating with a customer means using a contact to reach or, in some embodiments, attempt to reach the customer. For example, a phone call may be used to communicate with the customer. A phone call that is made to a customer but does not reach the customer may also be considered communicating because the missed call may show up on the customer's phone. Communicating with the customer may be audibly communicating with the customer, such as via a teleconference or a phone call and/or visually communicating with the customer, such as via a text message or email.

In decision block 330, if explicit denial is present then the system does not communicate with the customer via the contact. If explicit denial is not present, then the system continues to block 340, wherein it determines whether the contact requires permission to communicate with the customer.

In some embodiments, the contact requires permission to communicate with the customer because of a federal, state, or local law or regulation. For example, the Telephone Consumer Protection Act of 1991 requires the prior express consent of the called party before using an autodialer to contact any telephone number assigned to a paging service, cellular telephone service, specialized mobile radio service, or other radio common carrier service, or any service for which the called party is charged for the call. An autodialer is a computerized and/or mechanical system for communicating with a contact, such as an autodialer for dialing phone numbers. Analogous systems for email, text messages, or the like may also be considered auto dialers. As will be discussed herein, the system may also determine whether the contact falls within these criteria. Prior express consent may be explicit or implicit.

In another embodiment, a contact may require permission to communicate with the customer based on a business decision. For example, in some jurisdictions no law restricts a merchant from using an autodialer to communicate with a landline telephone. In these jurisdictions, however, a merchant may establish business decisions and rules requiring permission to communicate via one or more contact channels. For example, the merchant may establish a business decision rule requiring permission from the customer before the customer is contacted via text message or via a social networking site.

In a still further embodiment, a contact may require permission to communicate with the customer based on a request received from the customer. For example, the customer may inform the merchant that explicit permission to communicate via any contact currently in the system or added to the system at a later date is required.

Turning now to decision block 350, if permission is required, the system determines whether permission has been received in block 360. If permission is not required then the system communicates with the customer via the contact as shown in block 370.

In an embodiment, a decision engine determines whether permission has been received. In an embodiment, the decision engine determines whether permission is required and, if so, whether permission has been received. Permission may be express or implicit. In an embodiment, the decision engine is a processor and memory configured to cause computer readable code to perform specific actions. The decision engine receives information on the customer's history, the contact, and in some embodiments, additional information regarding the customer's financial actions. For example, the system may receive the customer account number, the type of contact, and the transaction history of the customer for one or more accounts.

In block 360, in some embodiments the system determines whether permission has been received based on account information for the customer. For example, the customer account may have an annotation showing that express permission has been granted to communicate with the customer via an autodialer. Turning briefly to FIG. 6, a record of contacts, e.g., phone numbers, for a customer, as well as explicit and/or implicit permission may be available to the system, such as via a database. In a first embodiment, the system first determines whether explicit permission has been received from the customer. If the system does not have explicit permission to communicate with the customer via the contact, then the system determines whether the merchant has received implicit permission to communicate with the customer via the relevant contact. FIG. 4 discusses how the system determines whether implicit permission has been received.

In block 370, the system communicates with the customer via the contact if permission is not required or if the system has permission to contact (express or implicit). The system may communicate via a manual or automated dial system, via a text messaging system, or the like. As should be understood, the system confirms that the permission, if required, is associated with the specific channel that the system uses to communicate with the customer. For example, explicit permission to communicate via a specific phone number may not provide permission to communicate via an email address.

In an embodiment, the system prompts a representative of the merchant, e.g., a person speaking with the customer on behalf of the merchant, to request explicit permission via a pop-up message or other visual or audible display visible to the representative. For example, the representative may be provided information regarding the customer on a screen of a computing device. FIGS. 5, 6, and 9 depict exemplary screenshots available to the representative that provide information to the representative during communication with the customer. FIG. 5 provides an account information page, FIG. 6 provides a specific contact and permissions page for a customer, and FIG. 9 provides an example of a pop-up information screen providing specialized information on the customer.

In a further embodiment, the representative also uses the communication to discuss a specific issue with the customer. For example, the representative may discuss an account in arrears with the customer. In some embodiments, the communications are automatically recorded. In other embodiments, the communications are only recorded at the request of the representative or the customer. In a still further embodiment, the communications are randomly selected to be recorded or recorded based on exceptions that occur before or during the communication.

FIG. 4 provides a general process flow 400 for a system and method of identifying implicit permission to contact, in accordance with an embodiment of the invention. In an embodiment, the system receives accounts including an account number and an account name; determines whether the account is subject to dialer restrictions; determines whether implicit permission to autodial the account has been receive; and dials the account.

In block 402, the system pulls all accounts from the strategy table. The accounts may include cash collateral accounts, bank loan accounts, and/or other types of accounts. In an embodiment, the accounts include records for the accounts such as transaction records, prior communication records, and the like. In some embodiments, the records and/or accounts are a subset of all records and/or accounts available to the system. For example, the records and accounts may be designated business critical by an administrator or algorithm based on some characteristic of the account. Block 404 depicts an exemplary table of accounts that are extracted from the strategy table. The table may include the account number and the consumer or customer name.

In block 406, the system determines the data that are relevant to TCPA regulations. As discussed, the TCPA limits which phone numbers may be contacted using automatic or electronic dialers. The system compares the contacts for the account from block 402 with records of phone numbers associated with TCPA restrictions and identifies those phone numbers for which the system requires advance express permission. The system may pull the TCPA mobile data from online banking systems of the merchant and/or application data, such as the application a customer filled out when applying for an account. Block 408 depicts an exemplary table of TCPA mobile data, including the account number, the consumer or customer, the phone number, the source of the phone number, and the data that the phone number was received.

In an embodiment, the system evaluates one or more databases to identify phone numbers that are relevant to TCPA regulations. For example, the system may connect to the TELCORDIA® database to identify phone numbers that were originally categorized as a mobile phone number. Because individuals may transfer phone numbers between mobile and landline, in some embodiments the system also evaluated NEUSTAR® databases to identify which phone numbers have been ported from landline to mobile.

In block 410, the system loads the data that are relevant to TCPA regulations. In an embodiment, the loading is conducted via an extract, transform, load process (ETL process). At least three processes may occur when the system loads the TCPA data. The system may attach implicit consent from the database to mobile numbers in the system; the system ignores phone numbers with explicit consent or denial; and the system adds new phone numbers to the account.

In an embodiment, the system determines new phone numbers based on evaluation of one or more external databases. For example, the system may evaluate new applications and updated online permissions to determine whether a customer has provided implicit permission to contact. A customer may have updated preferences on an account and in doing so granted implicit permission to be contacted.

In block 412, the system completes a series of steps for autopace or automatic dialing contact list generation. The system determines whether explicit denial for both landline and mobile phone numbers is present 414, determines if the phone is a mobile phone 416, determines if explicit permission for mobile phone numbers is present 418, and determines whether implicit permission for mobile phone numbers is present 420.

As discussed, the system can determine whether explicit denial is present in many different ways, some of which are disclosed in block 320 of FIG. 3. If explicit denial is present then the system stops contact with the customer via the phone number.

When developing autodialer campaigns, the system will also evaluate mobile phone and other contacts subject to specific restrictions (e.g., phone numbers where the recipient is charged for the call) under a separate scheme. The system determines if the contact is a mobile phone number, as shown in block 416. In an embodiment, the system evaluates the tables created in block 406 based on the online banking, application data, TELCORDIA®, and/or NEUSTAR® data.

The system determines if the merchant has explicit permission allowing the customer to be called or otherwise contacted at the mobile phone number, as shown in block 418. The explicit permission may also be in the data pulled in block 406.

Finally, the system determines if the merchant has implicit permission allowing the customer to be called or otherwise contacted at the mobile phone number, as shown in block 420. The implicit permission may be evaluated using the table loaded in block 410, where implicit permission is attached to the database.

Referring now to FIG. 5, an exemplary screenshot of a graphical representation of a primary information screen for a customer, in accordance with embodiments of the disclosure, is provided. It will be understood that the display page 500 can be embodied as portions of a dashboard application, portions of a portal application, as intranet pages, as Internet web pages, as the display associated with a mobile application, and/or the like. In an exemplary embodiment, the screenshot is provided to a representative that is communicating with or about to communicate with a customer on behalf of a merchant.

The exemplary display page 500 provides graphical information to the representative relating to the customer and/or the customer's accounts. In the example, primary information 502 is provided on a first tab, secondary information 504 is provided on a second tab, and demographic information 506 is provided on a third tab.

In an embodiment, the primary information 502 includes information on the customer including indicators 508 of specific characteristics of the customer. These may include whether the customer has multiple accounts 510 or has locked 512 one or more accounts. A locked account is an account that cannot be communicated with for some reason. The primary information 502 may also include list of contacts 514, e.g., phone numbers, as well as a link 516 to details of the contacts. Because contacts available to the system may change, the system may also allow the representative to refresh 518 the contacts list at any time. Additional information that may be included on the primary information 502 page including a description of the customer account types 520 (e.g., checking, savings, and the like) and the last address change 522. In some embodiments, the primary information page is customizable by the representative or an administrator. In an embodiment (not shown), the secondary information 504 includes information that may not be relevant to the planned communication but useful if the customer asks other questions about the customer's account. In an embodiment, the secondary information includes links to other sources of information on the customer. In a further embodiment (not shown), the demographic information 506 includes information on the demographics of the customer. For example, the age, career, and/or family status of the customer may be provided to the representative.

It should be understood that the exemplary screenshot is but one example of the graphical depictions that may be provided to a representative or administrator related to the system and method. Secondary information and/or demographic information on the customer may also be provided to the representative via the merchant's webpage or an application.

Turning again to FIG. 6, an exemplary screenshot of a graphical representation of contacts for a customer, in accordance with some embodiments of the disclosure, is provided. In this example, phone numbers are provided for a customer. This screen may be available to the representative based on the details link 516 in the display page 500. In some embodiments, the contacts page 600 includes the specific contacts 602 and an indicator 604 on whether the contact may be used. In some embodiments, the indicator 604 discloses whether a contact may be called, whether a contact may be called if the representative records an exception to some restriction on the call (e.g., the customer requested a phone call at a certain time that otherwise would not be permitted), or the contact may not be called with no exceptions. In some embodiments, the system also includes a record of the history of the contact, including the number of calls remaining 406, the number of messages remaining 608, the phone use (e.g., home or business) 610, the line type (e.g., cell or land-line) 612, and the state that the phone is registered in 614. In further embodiments, the contacts page 600 includes a record of whether, and in some cases when, permission to contact has been granted. For example, for each phone number the contacts page 600 may display whether permission has been received to use a dialer 616, whether permission has been received to use a pre-recorded message 618, whether permission has been received to use a text message 620, and whether implicit consent to be contacted has been received 622. Other types of consent may be available on this screen depending on the contacts present in the contact list. For example, if an email address is present in the contacts list, the screen may also track whether the system has permission to send automatically generated emails to the email address.

FIG. 7 provides a block diagram illustrating an exemplary financial institution banking system 700 in greater detail, in accordance with embodiments of the invention. The banking system 700 may be the merchant system that provides for the system and method disclosed in FIGS. 1-4. As illustrated in FIG. 7, in one embodiment of the invention, the banking system 700 includes a processing device 720 operatively coupled to a network communication interface 710 and a memory device 750. In certain embodiments, the banking system 700 is operated by a first entity, such as a financial institution, while in other embodiments the banking system 700 is operated by an entity other than a financial institution.

It should be understood that the memory device 750 may include one or more databases or other data structures/repositories. The memory device 750 also includes computer-executable program code that instructs the processing device 720 to operate the network communication interface 710 to perform certain communication functions of the banking system 700 described herein. For example, in one embodiment of the banking system 700, the memory device 750 includes, but is not limited to, a network server application 770, a customer account data repository 780, which includes customer account information 784, a decision engine 790, a permission monitoring routine 792, and other computer-executable instructions or other data. The computer-executable program code of the network server application 770 or the permission monitoring routine 792 may instruct the processing device 720 to perform certain logic, data-processing, and data-storing functions of the banking system 700 described herein, as well as communication functions of the banking system 700.

In an embodiment, the customer account data repository 780 includes customer account information 784. The customer account information may include account history for the customer, demographic information for the customer, any notations made by the customer or a representative on the customer's file, and the like.

In some embodiments, the permission monitoring routine 792 facilitates monitoring of explicit and implicit permission received from the customer. In an embodiment, the permission monitoring routine 792 tracks when permission is received from a customer to use a contact to communicate with the customer via one or more channels. For example, the permission monitoring routine 792 may identify when implicit permission has been granted by the customer, based on the system and method disclosed in FIG. 4, and update the customer information with the implicit permission.

As used herein, a "communication interface" generally includes a modem, server, transceiver, and/or other device for communicating with other devices on a network, and/or a user interface for communicating with one or more users. Referring again to FIG. 7, the network communication interface 710 is a communication interface having one or more communication devices configured to communicate with one or more other devices on the network, such as a representative work station, an autodialer, a customer contact, and the banking system 700. The processing device 720 is configured to use the network communication interface 710 to transmit and/or receive data and/or commands to and/or from the other devices connected to a network to allow communication between the devices.

FIG. 8 provides a block diagram illustrating technical components for a system 800 for determining permission to contact, in accordance with an embodiment of the present disclosure. As illustrated, the system 800 includes a customer 810, a merchant computer platform 820, a representative workstation 830 for a representative 812 and a network 840. It will be understood that the representative 812 has access to the representative workstation 830.

As shown in FIG. 8, the merchant computer platform 820 and representative workstation 830 are each operatively and selectively connected to the network 840, which may include one or more separate networks. In addition, the network 840 may include a local area network (LAN), a wide area network (WAN), and/or a global area network (GAN), such as the Internet. It will also be understood that the network 840 may be secure and/or unsecure and may also include wireless and/or wireline technology. The network 840 may be used to communicate with the customer 810 via the contact.

As shown in FIG. 8, in accordance with some embodiments of the present invention, the representative workstation 830 includes a communication interface 832, a processor 833, a memory 834 having a pop-up routine 835 stored therein, an autodialer or a connection to an autodialer 836, and a user interface 837. In such embodiments, the communication interface 832 is operatively and selectively connected to the processor 833, which is operatively and selectively connected to the user interface 837, the memory 834 and the autodialer 836.

The user interface 837 may allow the representative workstation 830 to receive data from the customer 810. In an embodiment, the representative workstation 830 may include any of a number of devices allowing the representative 812 to control the representative workstation 830 and communicate with the customer 850, such as a keypad, keyboard, touch-screen, touchpad, microphone, mouse, joystick, stylus, other pointer device, button, soft key, and/or other input device(s). In some embodiments, the user interface 837 also includes one or more user output devices, such as a display and/or speaker, for presenting information to the representative 812.

Each communication interface described herein, including the communication interface 832 and 822, generally includes hardware, and, in some instances, software, that enables a portion of the system 800, such as the processor 833 to transport, send, receive, and/or otherwise communicate information. For example, the communication interface 832 of the representative workstation 830 may include a modem, server, electrical connection, and/or other electronic device that operatively connects the representative workstation 830 to another electronic device, such as the electronic devices that make up the merchant computer platform 820 and/or the electronic device of the customer 810.

Each processor described herein, including the processor 833 and 824, generally includes circuitry for implementing the audio, visual, and/or logic functions of that portion of the system 800. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as the memory 834 of the representative workstation 830 and the memory 826 of the merchant computer platform 820.

Each memory device described herein, including the memory 834 for storing the pop-up routine 835 and the memory 826 of the merchant computer platform 820, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 8, the memory 834 of the representative workstation 830 includes the pop-up routine 835. The pop-up routine 835 provides alerts and/or information to the representative relating to the customer, the contact, or the call. For example, the pop-up routine may determine that the customer resides in a state having restrictions on certain questions during a phone call from a financial institution. The pop-up routine would display a special screen before or during the communication with the customer providing information on the restrictions. In some embodiments, the pop-up routine 835 includes computer-executable program code portions for instructing the processor 833 to perform one or more of the functions of the pop-up routine 835 described and/or contemplated herein. FIG. 9 depicts an exemplary screenshot and embodiments for a pop-up that is displayed to the representative by the pop-up routine 835.

It will be understood that the representative workstation 830 can be configured to implement one or more portions of the process flows described and/or contemplated herein. For example, in some embodiments, the representative workstation 830 is configured so that the communication interface 832 is operatively and selectively linked to the merchant computer platform 820 to receive autodialing campaigns or connect to an autodialer. For instance, information regarding the customers that will be contacted during an autodialing campaign, e.g. contacts, account history, or the like. In other embodiments (not shown) an application may be stored in the memory 834 of the representative workstation 830 that enables the workstation to perform some or all of the steps of process flows 300 shown in FIG. 3 and 400 shown in FIG. 4.

FIG. 8 also illustrates a merchant computer platform 820, in accordance with an embodiment of the present invention. The merchant computer platform 820 may include any computerized apparatus that can be configured to perform any one or more of the functions of the merchant computer platform 820 described and/or contemplated herein. In accordance with some embodiments, for example, the merchant computer platform 820 may include an engine, a platform, a server, a database system, a front end system, a back end system, a personal computer system, and/or the like. In some embodiments, such as the one illustrated in FIG. 8, the merchant computer platform 820 includes a communication interface 822, a processor 824 and a memory 826. In some embodiments, as illustrated in FIG. 8, customer data (such as contacts, transactional data, account history data, social network data and Internet data) 827, a decision engine 828 for determining permission, and an autodialing routine 829 may be stored in memory 826. The customer data 827 may have been previously collected and stored in the memory 826 of the merchant computer platform 820, or the merchant computer platform may actively collect customer data 827 by using the communication interface 822 to access the network 840 and only temporarily saves the customer data 827 to the memory to be accessed by the processor 824. The communication interface 822 is operatively and selectively connected to the processor 824, which is operatively and selectively connected to the memory 826.

It will be understood that the merchant computer platform 820 can be configured to implement one or more portions of the process flows described and/or contemplated herein. For example, in some embodiments, the merchant computer platform 820 is configured so that the processor uses a decision engine to determine when permission has been received and then instructs the autodialer to communicate with the customer via the contact. In certain embodiments the autodialing routine 829, stored in memory 826, is configured to control an autodialer. The autodialer may be integral with the system or may be external to the system yet connected over the network 840. In yet other embodiments, the decision engine 828 stored in memory 826 is configured to determine if permission is needed and, if so, determine if permission has been received.

It will be understood that the embodiment illustrated in FIG. 8 is exemplary and that other embodiments may vary. For example, in some embodiments, some or all of the portions of the system 800 may be combined into single portion. Specifically, in some embodiments, the merchant computer platform 820 is configured to perform all of the same functions of those separate portions as described and/or contemplated herein. Likewise, in some embodiments, some or all of the portions of the system 800 may be separated into two or more distinct portions.

FIG. 9 depicts an exemplary screenshot of a pop-up providing information to a representative prior to or during a communication with a customer, in accordance with some embodiments of this disclosure. The screenshot 900 includes an alert or notification to the representative about some portion of the communication. For example, the exemplary screenshot 900 includes an alert about post dated checks. The system determines that the customer is in state X based on the phone number or address of the customer accounts. Before or during the communication with the customer, the representative is made aware of specific regulations in state X relating to post dated checks. The pop-up also provides context of the notification, such as informing the representative that the notification is for the representative's benefit and should not be read to the customer. In still further embodiments, the representative must acknowledge the pop-up notification before the communication can begin. Other types of notifications, including consecutive notifications, may also be made available to the representative. In the example, a mini Miranda notification is provided to the representative as well as the post-dated check notification. Other types of notifications include notifying the representative that skip tracing is prohibited, that phone calls to business contacts are prohibited during non-working hours, as well as a definition of non-working hours, that a maximum number of contacts have been made to a customer or contact, or the like.

Determining Preferred Time to Contact

FIG. 10 illustrates a general process flow 1000 for an apparatus or system for determining optimal times for contacting a customer consistent with an embodiment of the present invention. As illustrated in block 1010, the process begins with identifying customer relationship data primarily relating to or affecting times an entity or merchant may contact a customer. As such, the system may identify all products or accounts that the customer may be associated with or have with the entity across one or more lines of business within the entity. In this way, the system may identify all information and/or reference sets associated with the products or accounts. Within the information and/or references sets, the system may identify or determine any customer preferences regarding preferred times or schedules that the customer may be contacted regarding the products or account and otherwise (e.g., customer-suggested contact times). In addition, the system may identify any addresses (e.g., home, work, and/or the like), phone numbers, e-mail addresses, and any other information that may be associated with the customer that may be used for determining one or more optimal/preferred times for contacting the customer.

Next, as illustrated in block 1020, the system determines a contact for the customer. In some embodiments, the contact for the customer is determined based at least partially on the identified customer relationship data. A contact is a piece of information that allows another party to communicate with the customer. For example, the contact may be a phone number, e.g., a landline or mobile phone number. The system disclosed herein may be used with various types of contacts, including phone numbers for voice or text messaging, email addresses, private messaging address (such as through a web forum, social network messaging, instant messaging, physical mail, in-person contact, messages provided when logging into merchant websites, messages on ATMs or receipts, and the like.

In some embodiments, the contact is provided by the customer. For example, the customer may enter a phone number into a form when applying for an account. The customer may provide an email address when registering for electronic statements. In further embodiments, the contact is retrieved by the system. For example, the system may determine that a newly opened account does not have a contact phone number associated with it but that the account is related to another account having an associated phone number. The system may also retrieve contacts from publicly-available information, such as databases of contacts for customers, social networks, or the like.

In some embodiments, the customer is a customer of the merchant, e.g., the financial institution communicating with the customer. The customer may have an account or relationship with the merchant. For example, the customer may have a credit card or line of credit with the merchant. In some embodiments, the merchant is communicating with the customer regarding accounts in arrears or discussing recovery of payment in arrears. In further embodiments, the customer is a customer of a third party associated with the merchant. For example, the merchant may be contracted to communicate with the customer by the third party. In a still further embodiment, the customer is a potential customer of the merchant or a third party. The customer may be an individual or an entity such as a business, non-profit, or governmental entity. The customer may have multiple contacts and multiple accounts with the merchant.

In some embodiments, the contact is determined automatically by the system. For example, the contact may be determined based on criteria associated with the customer. If the customer has an account in arrears, the contact may be determined by the system after a search criteria identifies the account in arrears. In some embodiments, the contact is identified based on search criteria entered by an administrator or representative. For example, the administrator may be creating an autodial campaign for phone numbers based on location, account characteristics, and the like. The system to determine permission to contact can act in the background to provide only those contact phone numbers which the system has permission to contact to the administrator. In this embodiment, search criteria are used to create an autodial list comprising contacts which the system has permission to contact.

Additionally, in some embodiments, the system determines any geographic information associated with each determined or identified contact of the customer. The system may determine that based on a zip code of a phone contact for the customer that the phone contact is associated with a particular city/state and thus, a certain time zone designated for the city state. As an example, the system may identify a work number and a home number of a customer. And, based on the area codes of each of the two numbers, the system determines that the work number of the customer originates from a city in Delaware and that the home number originates from a city in California. In such an example, the time zones for the two numbers are different and may be significant information in determining a preferred contact time for the customer. The system may, in some embodiments, be able to determine geographic information and time zone data of the customer based on zip codes associated with a home address, a work address, and/or the like. It will be understood that the system may determine geographic data and time zone data in other manners and should not be limited to the above examples. Other manners may include, but should not be limited to, by analyzing an e-mail address (e.g., country codes, or the like), customer input regarding geographic contact information, travel data associated with the customer, and/or the like.

Now, as illustrated in block 1030, the system may determine regulations and internal restrictions or internal policies associated with individual customer communications. Regulations may include laws or other regulations regarding the time of day a customer may be contacted, the amount of times within a given day/week/month that a customer may be contacted, a telephone number in which a customer may be contacted, or the like. As such, the system ensures that the representative is following all regulations and/or laws regarding the contacting of customers with products having payments in arrears. Internal regulations may include any rule that an entity may put in place to restrict or warn a representative prior to the representative contacting a customer or during the representative's communication with the customer. For example, an internal regulation may be set based on a customer communication preference, such as a specific telephone number to utilize for communications with the customer. In another example, the entity may identify an event that requires the entity to delay in communicating with a customer regarding a product with a payment in arrears (e.g., a natural disaster in the geographic are where the customer is located or another known event that may interfere with a customer providing payment).

In some embodiments, the regulations or restrictions may, in some instances, be overridden by the representative. In this way, the representative may still contact the customer even if a regulation or restriction is in place. The representative may need to input a reason for overriding the regulation or restriction. In some embodiments, the regulation or restriction may not be overridden by any representative. In this way, the system will not allow the representative to communicate with the customer at that time. In some embodiments, no regulation or restriction may be placed on a customer communication. As such, the representative may contact the customer at any time.

As illustrated in block 1040, the system determines one or more preferred contacts times for contacting a customer. In some embodiments, the one or more preferred contact times are determined based at least partially on a combination of data identified by the entity as relevant for determining preferred contact times for a customer. In such an embodiment, the combination of inputs may include data relating to one or more contacts for the customer, data relating to customer preferences for contacting a customer, data relating to regulations and internal policies associated with individual customer communications, work and/or personal schedules or calendars of a customer, geographic location and time zone data of the customer or customer contact, and any other information that may reasonably be used in determining one or more preferred contact times for the customer.

Still regarding block 1040, in some embodiments, the system uses some or all of the data identified by the entity as relevant for determining preferred contact times for a customer as input for determining a matrix of preferred contact times. As an example, the system may use as inputs for determining the matrix a work schedule for a customer, a home number for the customer, and various regulations and internal policies that govern entity communications with the individual customer. The matrix include seven columns representative of seven days (e.g., Sunday through Saturday) and twenty-four rows being representative of twenty-four hours in a day. So, based on the regulations and policies governing communications with the customer, it may be determined that the entity has a general contact time window of 9 am to 9 pm every day to contact the customer. However, inputting the work schedule of the customer into the matrix may then limit the contact time window of 9 am to 9 pm to 3 pm to 9 pm, since the work schedule indicates that the customer works for 8 am to 3 pm. Now, inputting data associated with the personal calendar of the customer may further limit the contact time window of 3 pm to 9 pm to 3 pm to 6 pm, since the personal calendar of the customer indicates that the customer is engaged in an activity that renders the customer unavailable to respond to a contact. Thus, in this example, the system may display the matrix to an agent or representative of the entity and further indicate that 3 pm to 6 pm is the preferred contact time for the particular customer. In some embodiments, the system may indicate preferred contacts in several manners including by color coding the matrix display (e.g., Green—Preferred Contact Time, Yellow—Preoccupied But Available for Contact, Red—Do Not Contact, a tiered representation, or the like), by using a binary system (e.g., blocking out all times that are not available and not blocking out the preferred contact times, by placing a customer contact (e.g., work number, home number, mobile number, and the like) in time slots that are preferred times for contacting the customer, and/or the like. It will be understood that the system may similarly use some or all of the data identified by the entity as relevant for determining and/or generating preferred contact times for a customer in order to determine a schedule of preferred contact times, a calendar of preferred contact times, a list of preferred contact times, or any other method or system for conveying preferred contact times of a customer. As another example, the system may use as input a home phone number of a customer, a work phone number of the customer, and a call time restriction of 9 am to 5 pm for determining preferred contact times for the customer. In such an example, the home phone number may have a California area code associated with a first time zone, such as the Pacific Time Zone, and the work phone number may have a Delaware area code associated with a second time zone, such as the Eastern Time Zone. In this example, the system may use, at least, these three factors as constraints for determining preferred contact times for the customer. As such, the system may calculate that based on the work phone number, home phone number, and internal call restrictions that the preferred times for contacting the customer is between the hours of 12 pm to 2 pm. In this way, whether the customer is in Delaware or California, an entity contacting the customer is not violating the internal restrictions for contacting the customer.

As illustrated in block 1050, once a matrix of preferred contact times for a customer is determined, the system identifies all preferred contact times for the customer. In some embodiments, the system is configured to identify and extract the contact times from the matrix, such that the preferred contact times for the customer may be provided to an agent or representative of an entity attempting to communicate with the customer. In one embodiment, preferred contact times for a customer that are identified from the matrix are stored with a reference set associated with the customer and/or linked with product or account information that the customer is associated with. In this way, when evaluating an account or product belonging to the customer, an agent or representative can easily determine preferred contact times of the customer because the preferred contact times are visually linked or presented in such a manner that an agent will notice such information. It will be understood that the system may also identify preferred contact times from a calendar of preferred contact times, a schedule of preferred contact times, a list of preferred contact times, and/or any other source of preferred contact times for the customer.

Preventing Contact by Locking

FIG. 11 illustrates a high level process flow 1100 for an apparatus or system for preventing a communication with a customer by locking access to customer information. In this way, the system may identify all interactions, events, conditions, or the like involving the customer that may potentially lead to locking certain portions or all customer account information and/or customer contact information.

As illustrated in block 1110, the process begins with identifying information relating to an event or a condition for that would trigger a lock of customer information. In some embodiments, a type of event that a system may identify as a locking event includes receiving a cease and desist correspondence from a customer and/or from a legal representative of the customer, where the cease and desist correspondence includes a request not to contact the customer. Another type of locking event that the system may identify includes identifying that a customer or a customer contact, such as a phone number, is attributed to an exclusion list and/or a restriction list. For example, based on prior dealings with a customer, an entity may provide a contact phone number of the customer to a phone number exclusion list, so that no agent or representative of the entity is able to communicate with the customer using the contact phone number of the customer on the phone number exclusion list. Yet, another type of locking event that the system may identify includes identifying or determining that an agent or representative of an entity is in real-time communication with a customer. As an example, an agent of an entity may contact a customer via telephone to service an account that the customer has with the entity. In such an example, the system may identify that the customer is engaged in a phone communication with the agent of the entity and as a result, lock contact information of the customer in order to prevent another agent from attempting to contact the same customer. The system may identify locking events in several ways and manners including identifying a manual entry by a representative indicating a locking event, analyzing or scanning customer files for information indicating a potential locking event or condition, and/or the like.

As illustrated in block 1120, a next step in the process 1100 is to flag identifying information relating to an event or a condition that would trigger a lock of customer information. In response to identifying a locking event or a locking condition, the system is configured to flag information associated with the locking event or condition for review. As an example, a system analyzes or reviews a customer file and/or a customer account and subsequently, identifies that the customer file has received a cease and desist correspondence. In such an example, the system may flag one or more of the customer file, an associated customer account, and/or the cease and desist correspondence, itself. The system, in some embodiments, is also configured to flag any customer information that may reasonably be affected by the identified locking event and/or identified locking condition. In some embodiments, flagging information relating to a locking event or condition triggers a notification indicating that the information associated with the locking event or condition requires specific review and validation. The notification may be presented to an agent and/or representative of an entity having the customer information. In one embodiment, the system provides an electronic or otherwise visible indicator proximate to information associated with the locking event or condition and/or proximate to customer information. In such an example, the visible indicator acts as a flag to indicate that the information requires review and/or specific validation.

Now, at block 1130, once information associated with the locking event or condition is reviewed and/or specifically validated, a system is configured to lock customer information. "Customer information," as referred to herein may include customer contact information (e.g., phone number, e-mail address, and/or the like), customer account information (e.g., credit card, loan account, mortgage account, and/or the like), and/or any information reasonably associated with a customer that an entity is attempting to communicate with, which may include information that the entity maintains or receives from a third party. A "lock," as referred to herein relates to any reasonable measure taken by an entity to prevent access to or use of an item or information. A lock as it particularly relates to the present invention may include several manners of preventing access to or use of customer information in order to prevent an agent of an entity from communicating with a customer. As a first example, a system may lock electronic information associated with a customer file or customer account, such that an agent using a computing device cannot electronically access the customer file or account. In such an example, an agent of an entity attempting to communicate with a customer may search for information associated with the customer and in return receive a prompt or message, such as "Access Denied," "Information Restricted," or "Do Not Communicate With Customer." In another example, a system may lock customer information by prevent an agent attempting to contact a customer to dial out a phone contact associated with the customer or preventing transmission of an e-mail or any other form of electronic communication to a customer by the agent. In some embodiments, a system may lock customer information by presenting a prompt or message via a user interface having customer information, where the prompt or message instructs an agent or representative of an entity not to communicate with the customer. In some embodiments, a system may lock customer information by specifically blocking customer contact information. As an example, an agent of an agent may access a customer file in an attempt to communicate with the customer. Upon accessing the customer file, the system selectively blocks customer contact information in the file, such that the customer contact information (e.g., phone number(s), e-mail, address, or the like) is not visible to the agent. In one embodiment, a system may lock customer information by first identifying all customer information and placing the customer information in a new or restricted access folder, such that no agents or such that only certain agents having special authority can access the folder having the customer information.

Still regarding block 1130, in some embodiments, a lock of customer information may be done at various levels and/or with varying scope. As an example, depending on the type of locking triggering event that occurs, the system may lock only a portion and/or all of the channels of communication with the associated customer. In some instances, a lock may be placed at a customer-level, customer household-level, and the like. For example, when two or more customers in the same household share a channel of communication, such as, a common home phone number, when a lock triggering occurs for one of the two or more customers in the same household, the system will lock the channel of communication, such that none of the two or more customers in that household may be reached using the channel of communication. In this way, by locking the channel of communication associated with both customers, it may prevent an accidental violation of internal policies or external regulations governing communications between a customer and an entity attempting to contact the customer regarding an account. It will be understood that the above is just an example and the channels of communication may include more than a common phone and may further include any form or channel of communication, including but not limited to, e-mail, text messaging (SMS), text-chatting (chat messaging, social media messaging, and the like.

At block 1140, a system provides a notification indicating a lock of customer information to an agent or representative of an entity attempting to contact the customer based at least partially on identifying a locking event and/or a review/specific validation of the identified locking event. The notification may be provided to any agent or representative that is in communication with a customer, working with the customer, or may potentially communicate the customer to resolve an account or product. In some embodiments, the notification is provided to the system so that when the customer information is accessed, the notification is automatically triggered, displayed, or otherwise communicated to the system or agent accessing the customer information. In some embodiments, the notification provided to the agent or representative includes information indicating a scope of the lock of the customer information. The scope of a lock of customer information may be determined during the review and/or specific validation process. As an example, a system may identify a cease and desist correspondence as a locking event. During the review, in such an example, a system or agent may determine that the correspondence only addresses the ceasing of communication to a work phone number of a customer. Thus, continuing with the example, the scope of the lock of customer information is only partial and limited to preventing an agent from communicating with a customer using the work phone number of the customer. In another example, a system may identify an exclusion list as a locking event. In this example, during the review, it is determined that the exclusion list restricts communicating with the customer using any customer information or another other means. In such an example, a notification indicating a lock of customer information may comprise information indicating that there is a full lock on the customer information meaning that the system is preventing access or use of any customer information for attempting to communicate with the customer and/or agents should not attempt to contact the customer in any manner.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer.

Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for preventing a customer communication by locking access to customer information, the system comprising:
 a representative workstation, comprising one or more devices allowing a representative associated with an entity to control the representative workstation and communicate to a customer;

a computer apparatus including a processor and a memory; and a software module stored in the memory, comprising executable instructions that when executed by the processor cause the processor to:
identify information relating to an event or condition that triggers a lock of customer information associated with a customer, wherein the event or condition is identifying that the customer is engaged in communication with a second representative, wherein the customer information associated with the customer is a customer contact information and customer account information;
based at least partially on identifying information relating to the event or condition that triggers the lock, lock at least a portion of the customer information associated with the customer by placing at least the portion of the customer information in a restricted access folder to disable use of at least the portion of the customer information on the representative workstation, wherein at least one of the one or more devices of the representative workstation is prevented from communicating with the customer;
generate a notification indicating that at least the portion of the customer information associated with the customer is locked; and
allow for override of the lock by the representative, wherein the representative inputs a reason for overriding the lock.

2. The system of claim 1, wherein the software module further comprises executable instructions for flagging for review and/or specific validation the identifying information relating to the event or condition that triggers the lock.

3. The system of claim 1, wherein the event or condition relates to a determination that the entity attempting to communicate with the customer has received a cease and desist letter from said customer.

4. The system of claim 1, wherein the event or condition relates to a determination that the customer or information associated with the customer is attributed to an exclusion list for not contacting the customer.

5. The system of claim 1, wherein the event or condition relates to a determination that the customer is in real-time communication with an agent of the entity attempting to communicate with the customer.

6. The system of claim 1, wherein locking at least the portion of the customer information associated with the customer comprises preventing dialing of a phone contact or transmission of an email.

7. A computer program product for preventing a customer communication by locking access to customer information, the computer program product comprising a non-transitory computer-readable medium, wherein the non-transitory computer-readable medium comprises one or more computer-executable program code portions that, when executed by a computer, cause the computer to:
identify information relating to an event or condition that triggers a lock of customer information associated with a customer, wherein the event or condition is identifying that the customer is engaged in communication with a second representative, wherein the customer information associated with the customer is a customer contact information and customer account information;
based at least partially on identifying information relating to the event or condition that triggers the lock, lock at least a portion of the customer information associated with the customer by placing at least the portion of the customer information in a restricted access folder to disable use of at least the portion of the customer information on the representative workstation, wherein at least one of the one or more devices of the representative workstation is prevented from communicating with the customer;
generate a notification indicating that at least the portion of the customer information associated with the customer is locked; and
allow for override of the lock by a representative associated with the representative workstation, wherein the representative inputs a reason for overriding the lock.

8. The computer program product of claim 7, the one or more computer-executable program code portions cause the computer to flag for review and/or specific validation the identifying information relating to the event or condition that triggers the lock.

9. The computer program product of claim 7, wherein the event or condition relates to a determination that an entity attempting to communicate with the customer has received a cease and desist letter from said customer.

10. The computer program product of claim 7, wherein the event or condition relates to a determination that the customer or information associated with the customer is attributed to an exclusion list for not contacting the customer.

11. The computer program product of claim 7, wherein the event or condition relates to a determination that the customer is in real-time communication with an agent of an entity attempting to communicate with the customer.

12. The computer program product of claim 7, wherein locking at least the portion of the customer information associated with the customer comprises preventing dialing of a phone contact or transmission of an email.

13. A method for preventing a customer communication by locking access to customer information, the method comprising:
determining one or more contacts for a customer, wherein the one or more contacts include customer contact information and customer account information;
determining regulations and/or policies associated with communicating with customers;
determining that a merchant has received conditional explicit denial to communicate with the customer using the customer contact information associated with the customer;
identifying information relating to an event or condition that triggers a lock of customer information associated with a customer, wherein the event or condition is identifying that the customer is engaged in communication with a second representative
based at least partially on determining that the merchant has received conditional explicit denial to communicate with the customer or identifying information relating to the event or condition, locking at least a portion of the one or more contacts for the customer by placing at least the portion of the customer information in a restricted access folder to disable use of at least the portion of the one or more contacts for the customer on a representative workstation, wherein at least one of one or more devices of the representative workstation is prevented from communicating with the customer;
generating a notification indicating that at least the portion of the one or more contacts for the customer is locked; and allowing for override of the lock by the representative, wherein the representative inputs a reason for overriding the lock.

14. The method of claim 13 further comprising flagging for review and/or specific validation identifying information relating to an event or condition that triggers the lock.

15. The method of claim 13, wherein the regulations and/or policies associated with communicating with customers relate to rules for restricting times of day the customer may be contacted by a business entity.

16. The method of claim 14, wherein the event or condition relates to a determination that the customer or information associated with the customer is attributed to an exclusion list for not contacting the customer.

17. The method of claim 14, wherein the event or condition relates to a determination that the customer is in real-time communication with an agent of an entity attempting to communicate with the customer.

18. The method of claim 13, wherein locking at least the portion of the one or more contacts for the customer includes preventing an access to at least the portion of the one or more contacts customer information by an agent of an entity attempting to contact the customer by denying access to at least a portion of electronic data associated with the customer.

19. The method of claim 13, wherein locking at least the portion of the one or more contacts for the customer comprises preventing dialing of a phone contact or transmission of an email.

* * * * *